(12) United States Patent
Kwon et al.

(10) Patent No.: US 10,946,339 B2
(45) Date of Patent: Mar. 16, 2021

(54) WATER TREATMENT APPARATUS

(71) Applicant: COWAY CO., LTD., Chungcheongnam-do (KR)

(72) Inventors: Tae-Seong Kwon, Seoul (KR); Soo-Young Lee, Seoul (KR); Hyoung-Min Moon, Seoul (KR); Sang-Hyeon Kang, Seoul (KR); Byung-Kil Park, Seoul (KR)

(73) Assignee: Coway Co., Ltd

( * ) Notice: Subject to any disclaimer, the term of this patent is extended or adjusted under 35 U.S.C. 154(b) by 767 days.

(21) Appl. No.: 15/121,301

(22) PCT Filed: Feb. 13, 2015

(86) PCT No.: PCT/KR2015/001494
§ 371 (c)(1),
(2) Date: Aug. 24, 2016

(87) PCT Pub. No.: WO2015/126107
PCT Pub. Date: Aug. 27, 2015

(65) Prior Publication Data
US 2017/0014769 A1    Jan. 19, 2017

(30) Foreign Application Priority Data

Feb. 24, 2014 (KR) .................. 10-2014-0021447
Nov. 20, 2014 (KR) .................. 10-2014-0162380

(51) Int. Cl.
*B01D 61/10* (2006.01)
*B01D 61/02* (2006.01)
(Continued)

(52) U.S. Cl.
CPC ............. *B01D 61/10* (2013.01); *B01D 61/12* (2013.01); *C02F 1/008* (2013.01); *C02F 1/441* (2013.01);
(Continued)

(58) Field of Classification Search
CPC ........ B01D 61/02; B01D 61/10; B01D 61/12; B01D 61/025; B01D 2313/18;
(Continued)

(56) References Cited

U.S. PATENT DOCUMENTS 6,764,595 B1 * 7/2004 Halemba ................ B01D 61/08
137/590
2014/0209525 A1   7/2014 Ikemizu

FOREIGN PATENT DOCUMENTS

CN    201591468    9/2010
JP    10180253    7/1998
(Continued)

OTHER PUBLICATIONS

Korean Office Action dated Sep. 15, 2017 issued in counterpart application No. 10-2014-0162380, 9 pages.
(Continued)

*Primary Examiner* — Robert Clemente
*Assistant Examiner* — Akash K Varma
(74) *Attorney, Agent, or Firm* — The Farrell Law Firm, P.C.

(57) ABSTRACT

A water treatment apparatus is disclosed. The water treatment apparatus, according to one embodiment of the present invention, may comprise: a filter unit comprising a reverse osmosis filter for supplying purified water filtered from raw water, and residential water which could not be filtered from raw water; a storage unit connected to the filter unit and comprising a storage member in which purified water is stored, then discharged, and a housing within which the storage member is provided, and through which residential water inflows and outflows; and a flow path changing valve connected to the filter unit and the storage unit, and which allows residential water to outflow from the housing as purified water is stored in the storage member, or allows
(Continued)

purified water to be discharged from the storage member as residential water inflows into the housing.

13 Claims, 14 Drawing Sheets

(51) Int. Cl.
   *B01D 61/12* (2006.01)
   *C02F 1/44* (2006.01)
   *C02F 1/00* (2006.01)

(52) U.S. Cl.
   CPC ........ *B01D 61/025* (2013.01); *B01D 2313/18* (2013.01); *B01D 2313/50* (2013.01); *C02F 2201/005* (2013.01); *C02F 2301/04* (2013.01)

(58) Field of Classification Search
   CPC ...... B01D 2313/50; C02F 1/008; C02F 1/441; C02F 1/44; C02F 1/00; C02F 2201/005; C02F 2301/04

USPC .......................................................... 210/117
   See application file for complete search history.

(56) References Cited

FOREIGN PATENT DOCUMENTS

| | | |
|---|---|---|
| JP | 3756217 | 3/2006 |
| KR | 1020040053818 | 6/2004 |
| KR | 1020120131720 | 12/2012 |
| KR | 1020130073109 | 7/2013 |
| KR | 1020140020342 | 2/2014 |
| KR | 1020140085826 | 7/2014 |
| WO | WO 2012/091802 | 7/2012 |
| WO | WO 2013/011743 | 1/2013 |

OTHER PUBLICATIONS

European Search Report dated Mar. 23, 2017 issued in counterpart application No. 15751867.1-1371, 8 pages.

* cited by examiner

[Figure 1]
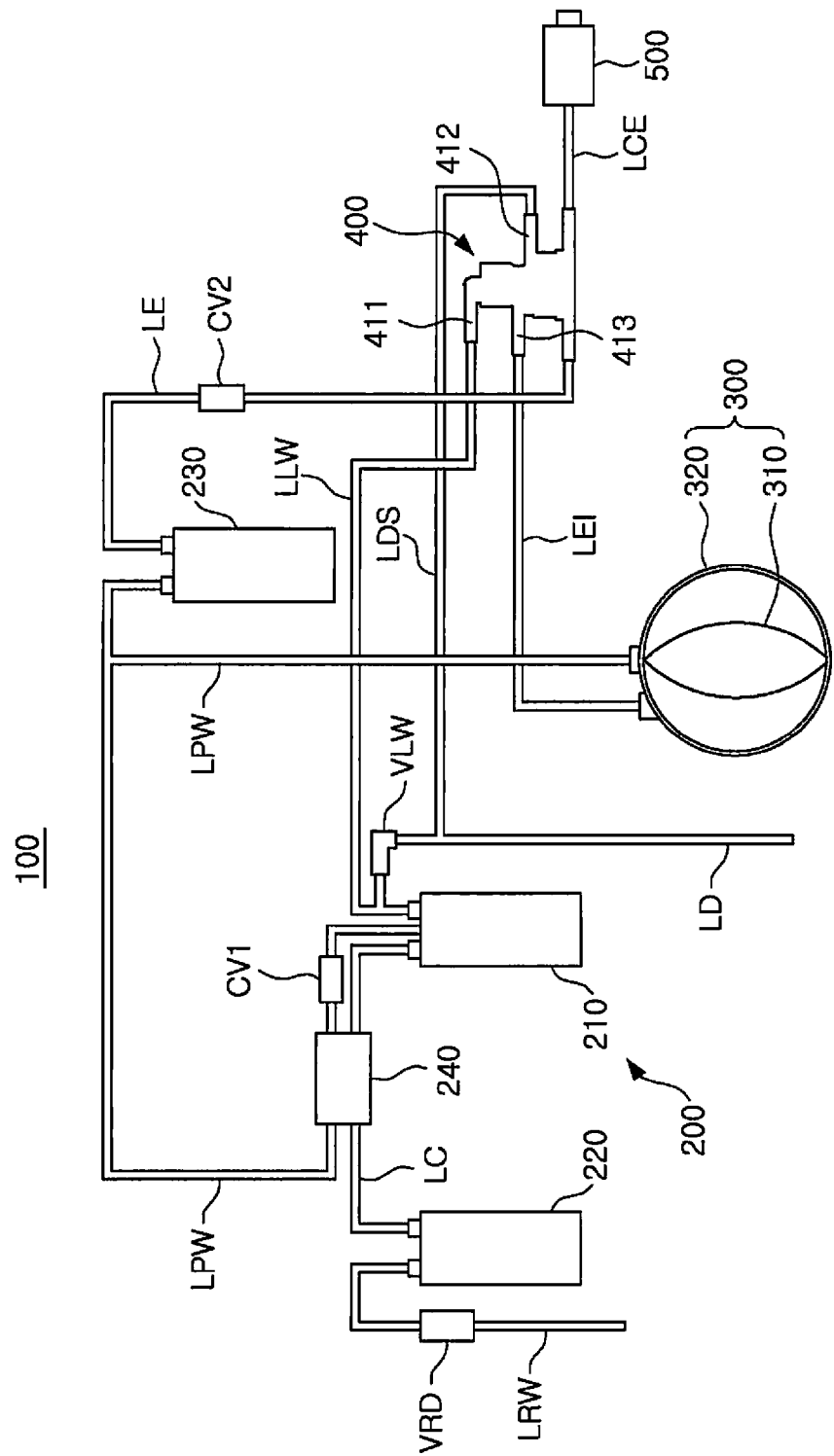

[Figure 2]
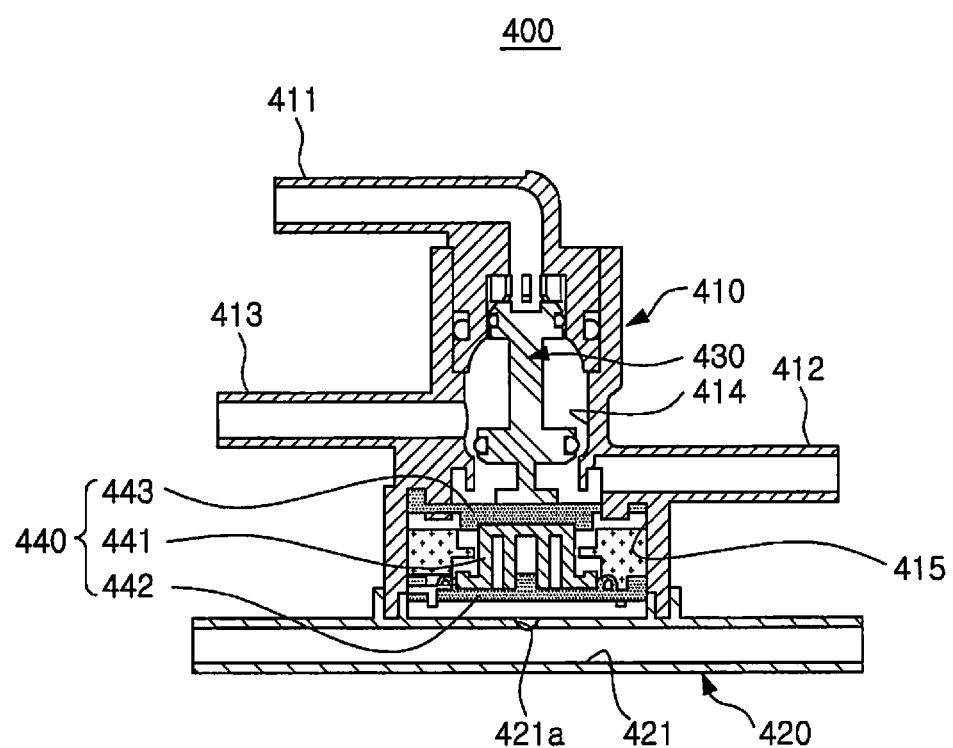

【Figure 3】
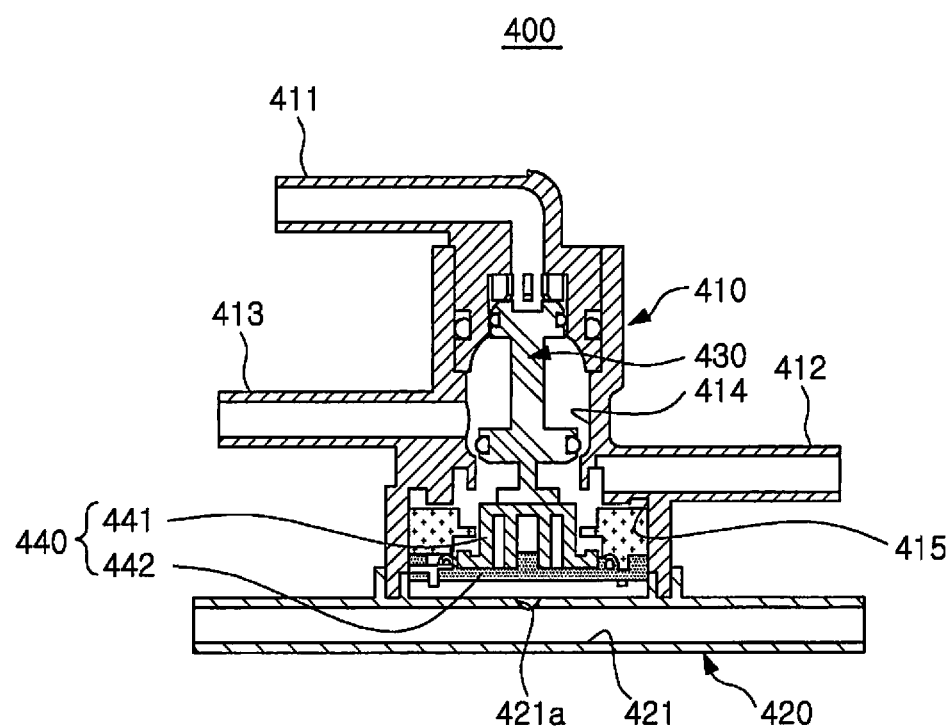

[Figure 4]
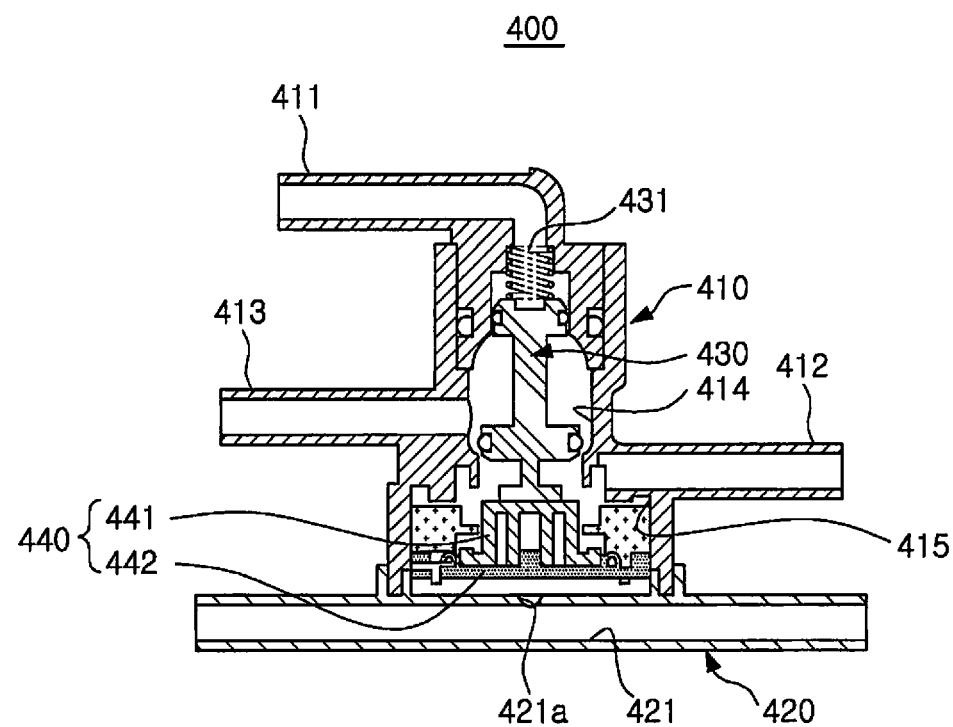

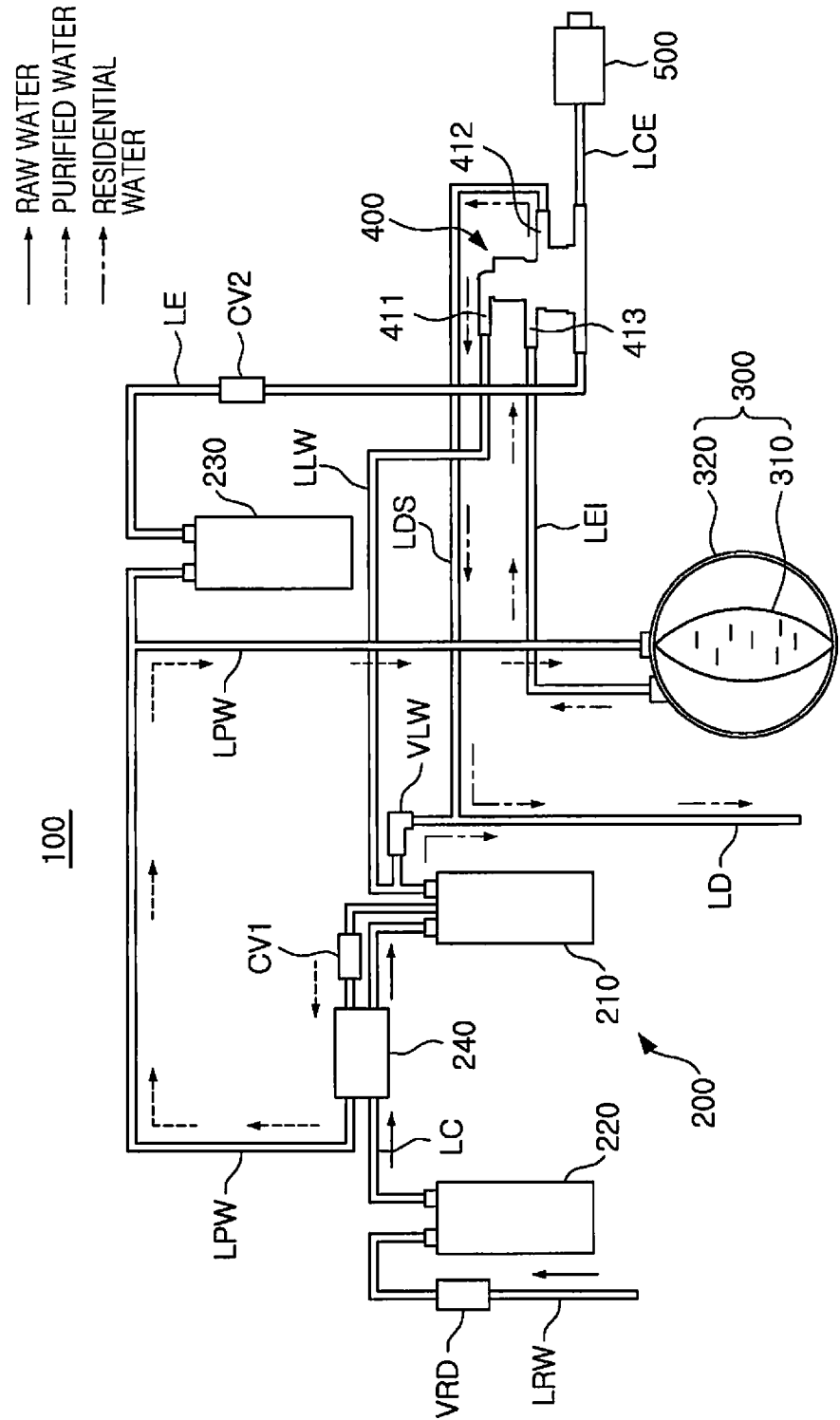
[Figure 5]

【Figure 6】
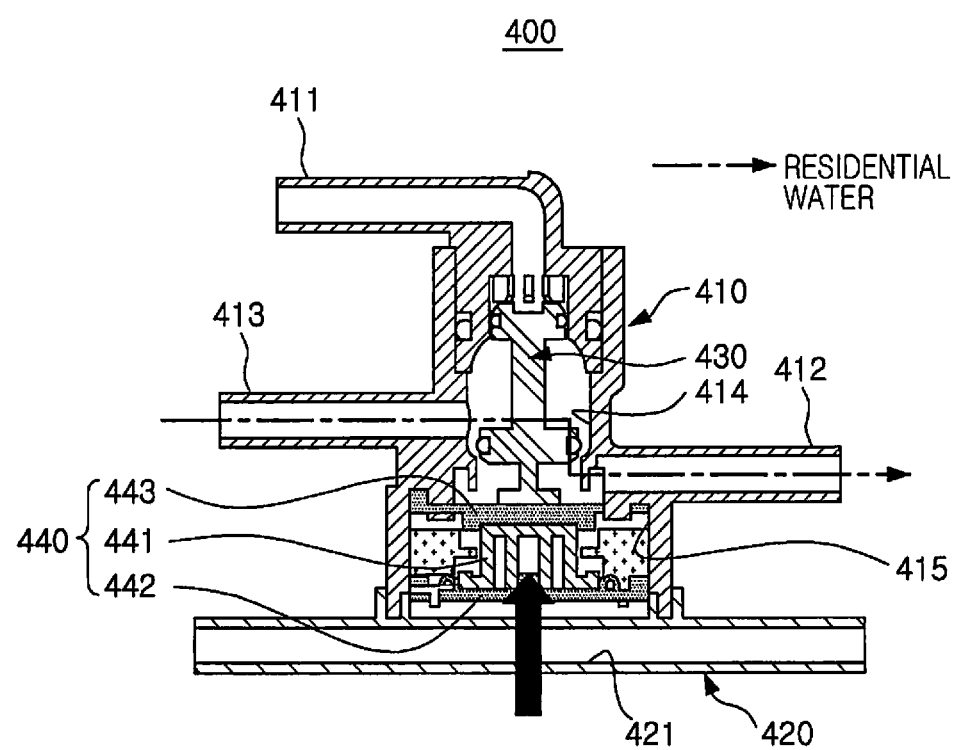

[Figure 7]
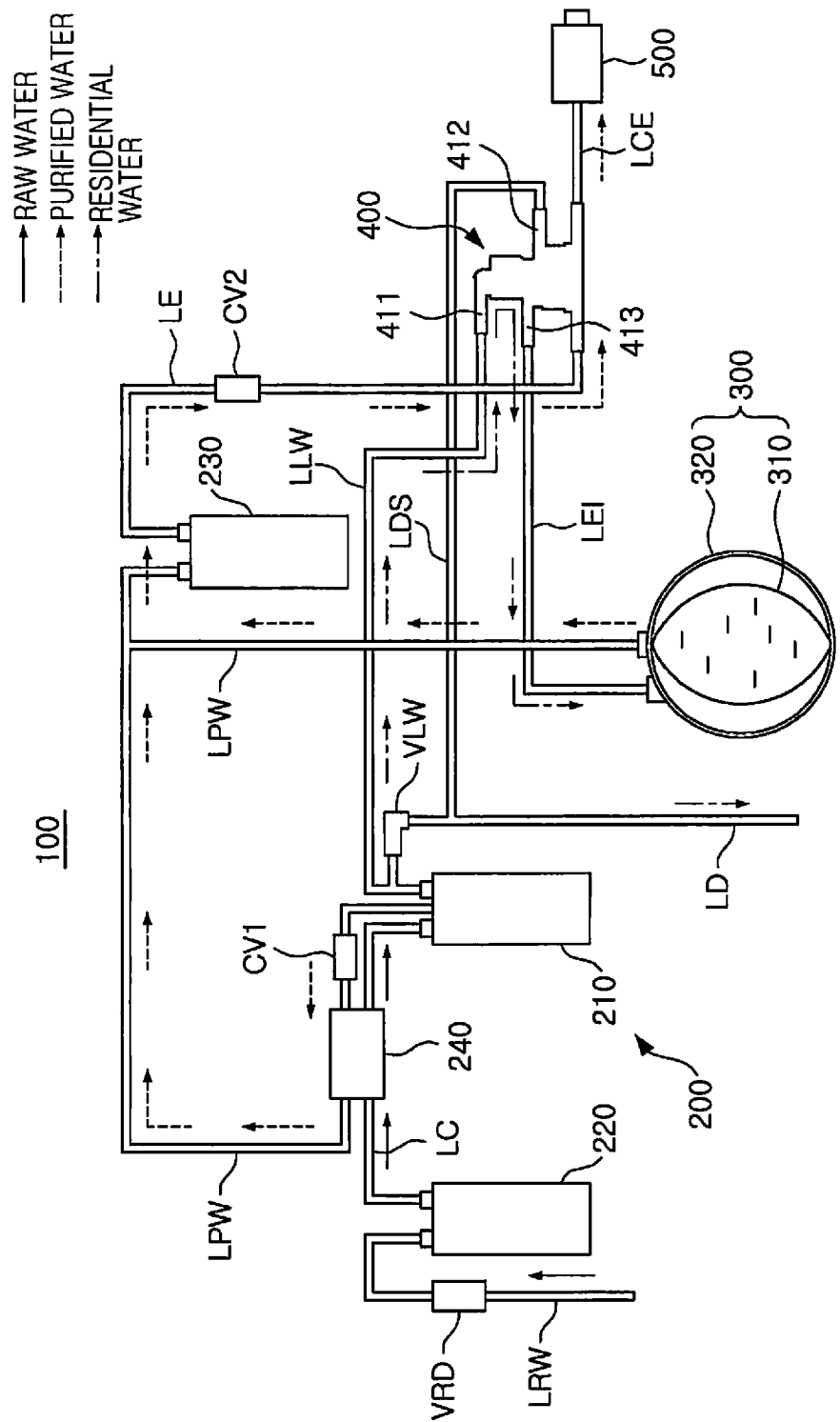

[Figure 8]
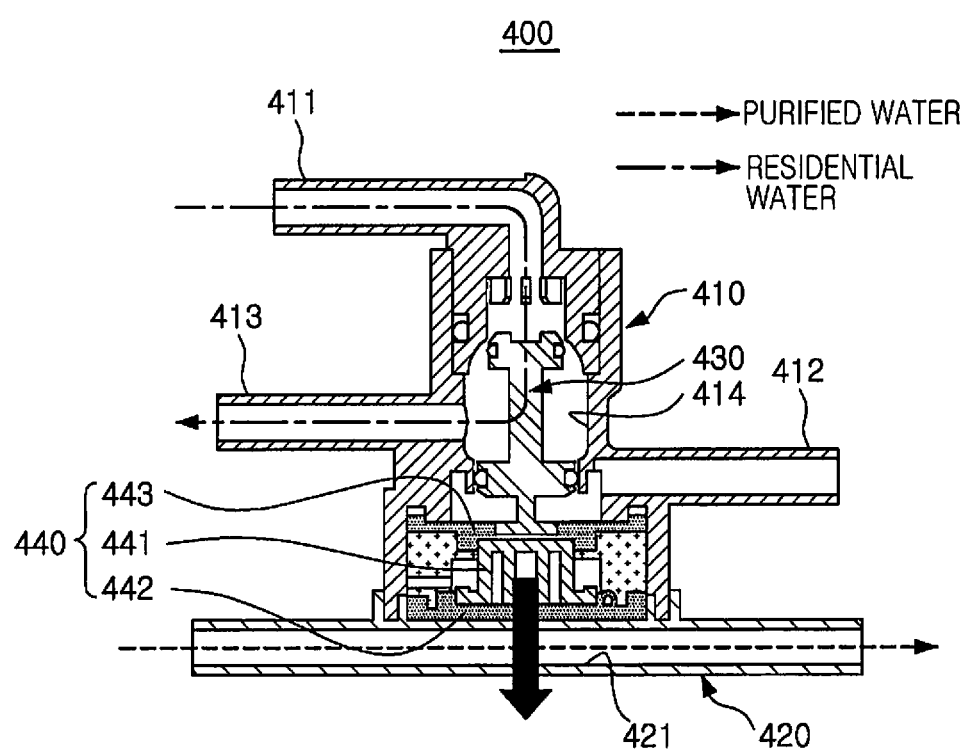

【Figure 9】
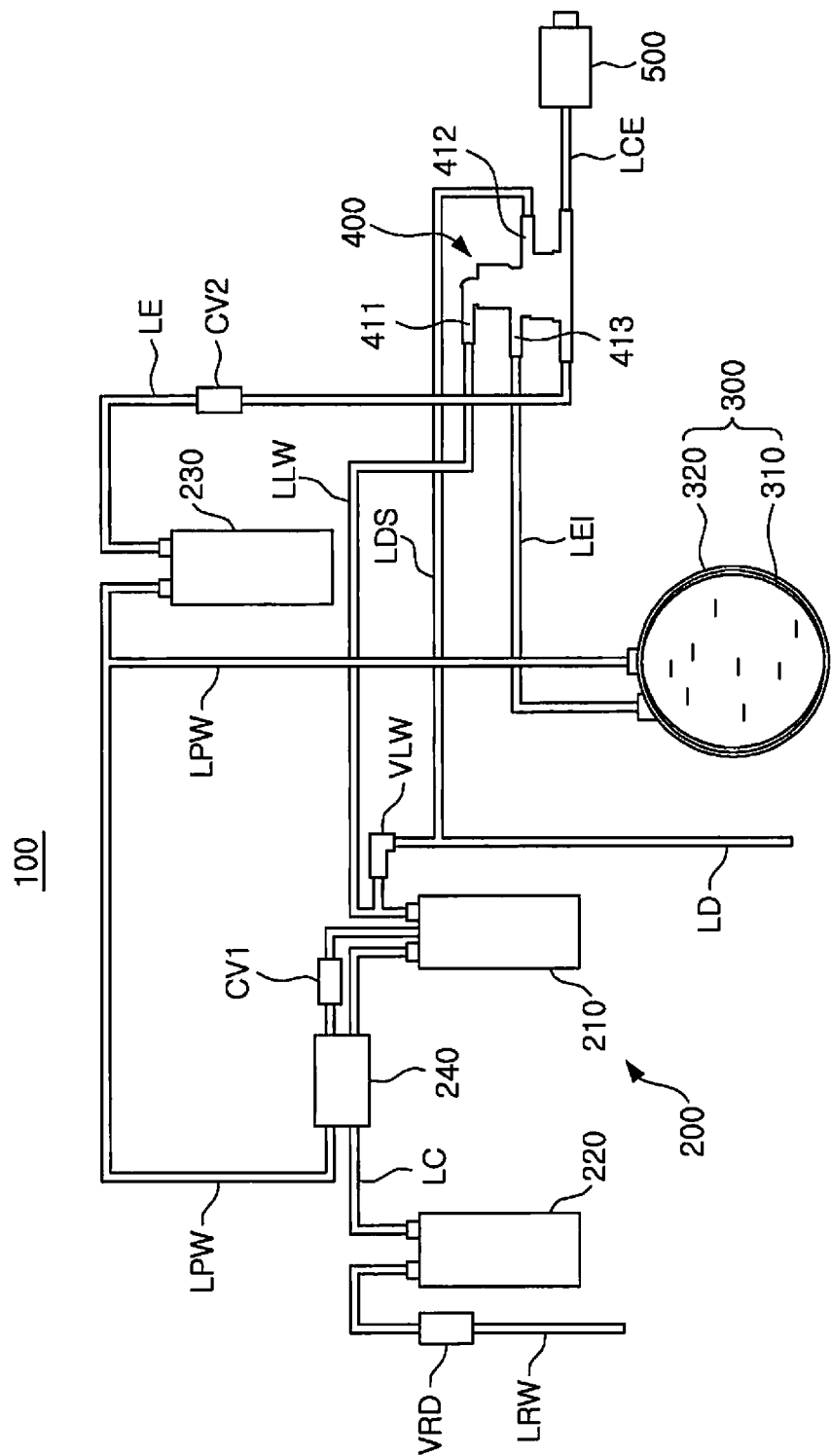

[Figure 10]
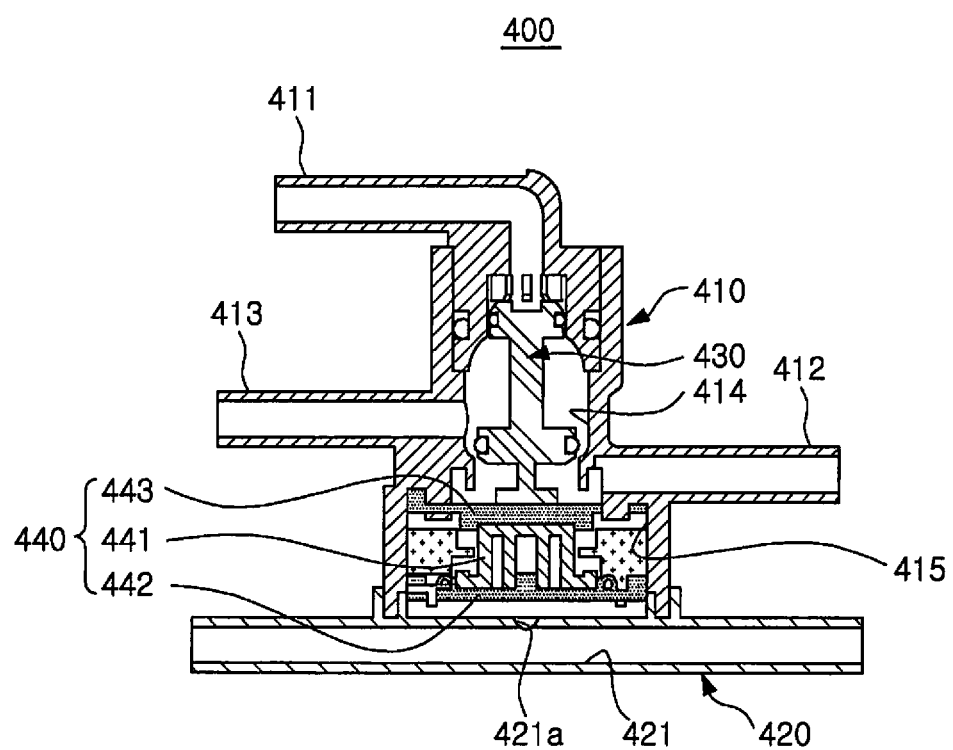

【Figure 11】
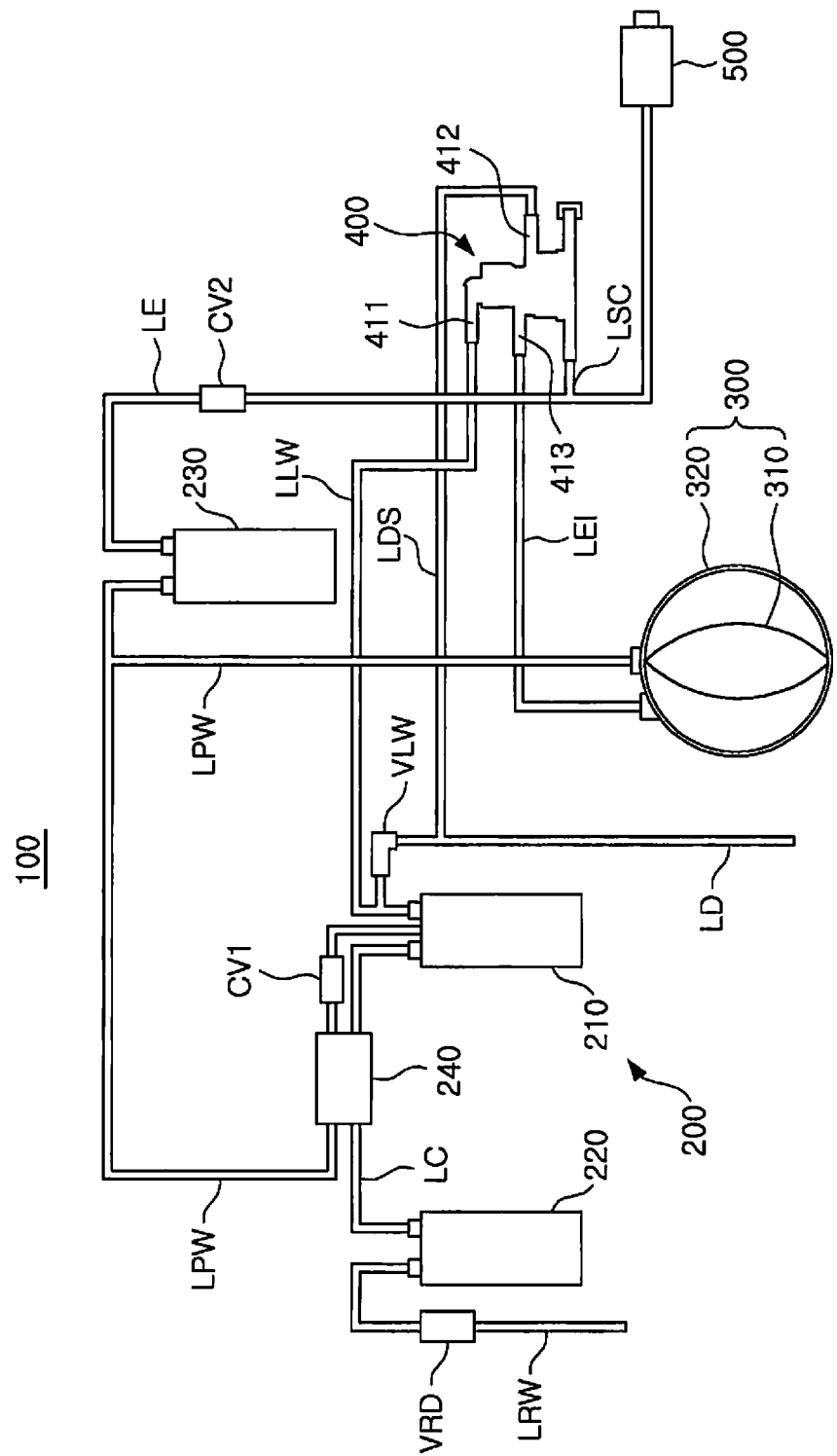

[Figure 12]
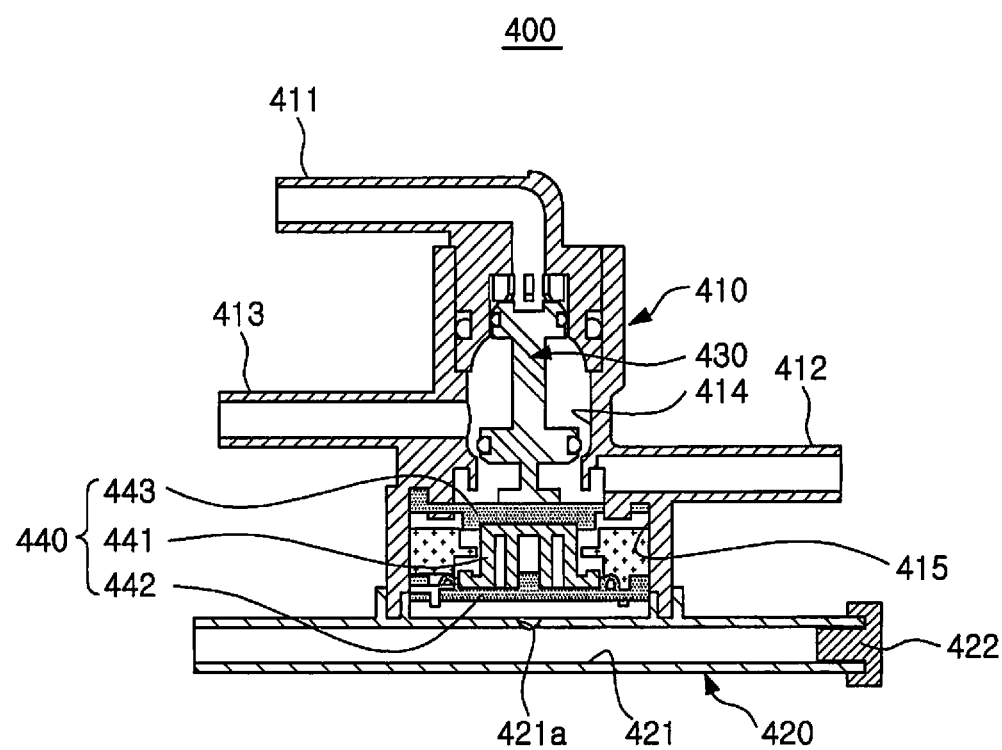

【Figure 13】
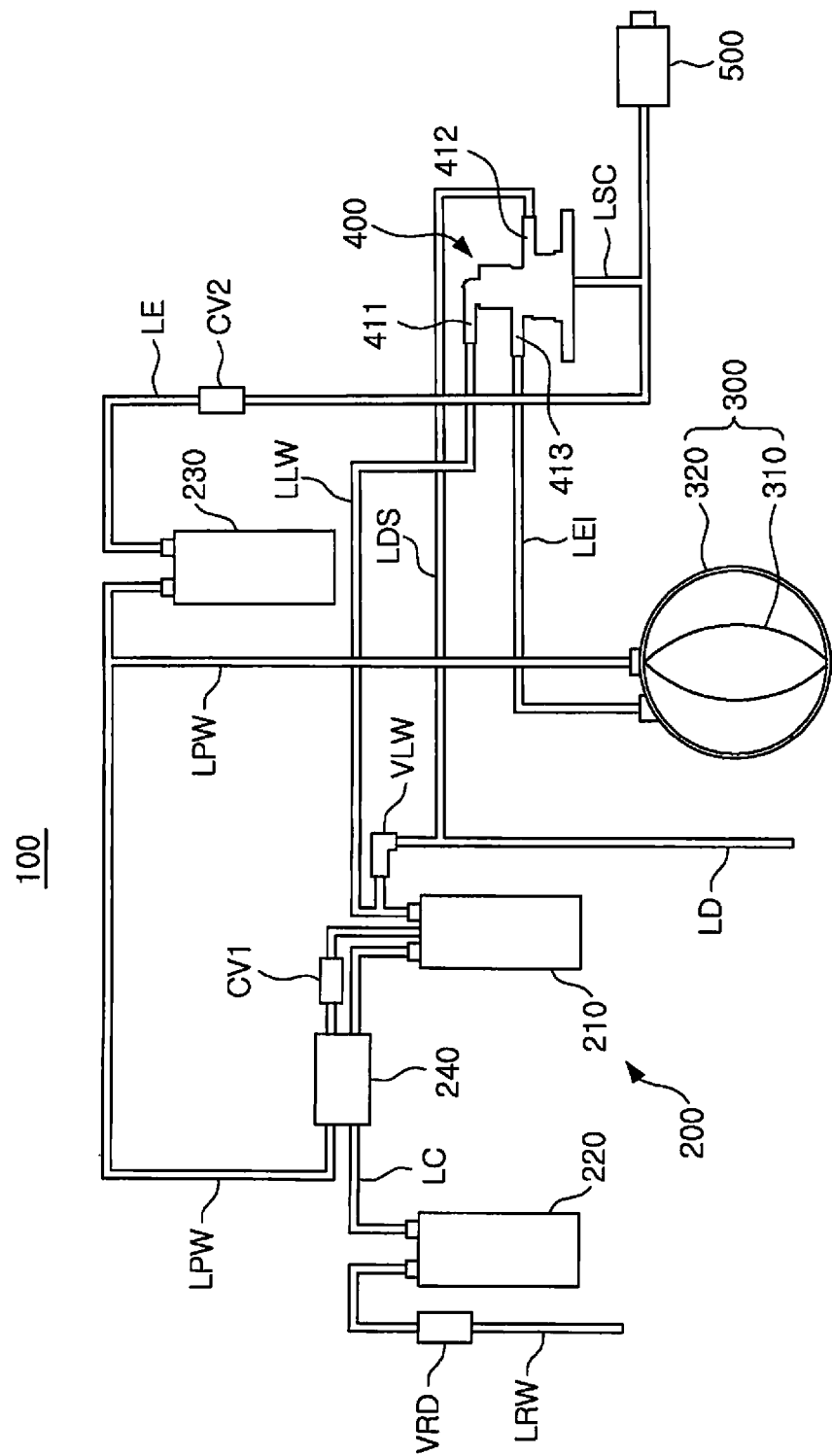

[Figure 14]
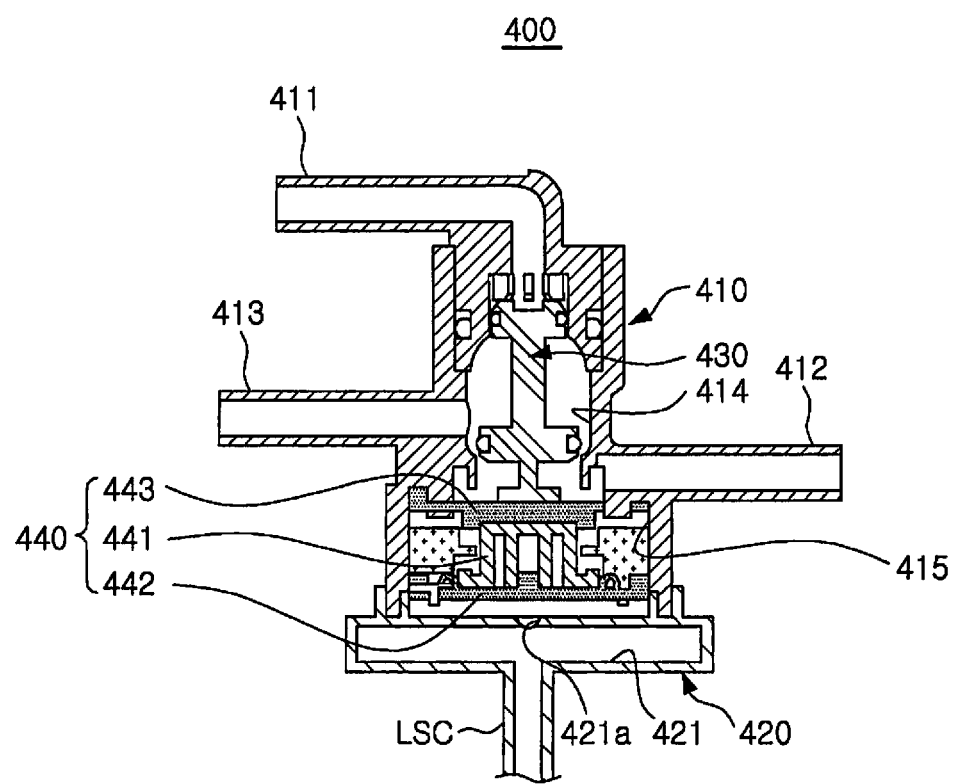

WATER TREATMENT APPARATUS

PRIORITY

This application is a National Phase Entry of PCT International Application No. PCT/KR2015/001494, which was filed on Feb. 13, 2015, and claims priority to Korean Patent Application No. 10-2014-0021447, which was filed on Feb. 24, 2014, and to Korean Patent Application No. 10-2014-0162380, which was filed on Nov. 20, 2014, the contents of each of which are incorporated herein by reference.

TECHNICAL FIELD

The present disclosure relates to a water treatment apparatus for treating water flowing therein, and externally discharging treated water to be supplied to a user. More particularly, the present disclosure relates to a water treatment apparatus, in which purified water, filtered by a reverse osmosis filter, is stored in a storage member provided within a housing, or in which residential water, unable to be filtered by a reverse osmosis filter, flows into a housing, thereby allowing purified water stored in a storage member to be discharged, using a single flow path changing valve.

BACKGROUND ART

Water treatment apparatuses are devices treating water flowing therein, and then externally discharging treated water to be supplied to users.

As water treatment apparatuses, water purifiers, including one or more water filters, are used to filter inflowing water, and then supply purified water to users. Besides the water purifiers described above, carbonators and ionic water generators are also used. The former supplies carbon dioxide to inflowing water, to supply carbonated water to users. The latter, in which inflowing water is subjected to electrolysis to make it alkaline or acidic, to thus be supplied to users, is also used.

On the other hand, reverse osmosis filters may be provided as water filters for water treatment, and may be included in water purifiers. When water flows into a reverse osmosis filter, a portion of the water is filtered to become purified water, and the remainder, unable to be filtered, is provided as residential water. Purified water, having been filtered by a reverse osmosis filter and discharged therefrom, has lower pressure than that of water flowing into the reverse osmosis filter.

Water purifiers may also include water tanks, into which filtered purified-water flows, and in which it is stored. In the case in which a reverse osmosis filter is used as a water filter in a water purifier, since purified water filtered by the reverse osmosis filter has had its pressure reduced, when the purified water is introduced to and stored in a water tank, the purified water has a relatively low pressure. Accordingly, water purifiers have had limitations in terms of a position in which purified water is discharged, when the purified water is supplied to a user.

For example, only in the case that a water discharge member, such as a cock, a faucet, or the like, connected to a water tank to externally discharge purified water stored in the water tank, is located at a position lower than the low-water level of the water tank, it is possible to externally discharge purified water stored in the water tank through the water discharge member.

In order to solve this problem, surge tanks, configured to maintain a predetermined degree of pressure even in the case in which purified water flows in at a relatively low pressure, have been used as water tanks. However, in this case, since counterpressure, from a water tank, a surge tank, may act on a reverse osmosis filter, the flow rate of purified water discharged from the reverse osmosis filter may be reduced, and the filtering efficiency of the reverse osmosis filter may also be greatly reduced.

DISCLOSURE

Technical Problem

An aspect of the present disclosure is to provide a water treatment apparatus, provided to address at least one requirement or problem occurring in water treatment apparatuses according to the related art.

An aspect of the present disclosure is to provide a water treatment apparatus from which purified water may be easily externally discharged, while using a reverse osmosis filter.

Another aspect of the present disclosure is to provide a water treatment apparatus in which a location of a water discharge member discharging purified water is not limited, while using a reverse osmosis filter.

Another aspect of the present disclosure is to provide a water treatment apparatus in which counterpressure is prevented from acting on a reverse osmosis filter.

Another aspect of the present disclosure is to provide a water treatment apparatus in which a reduction in a flow rate of purified water filtered by and discharged from a reverse osmosis filter is prevented and deteriorations in filtering efficiency are prevented.

Technical Solution

A water treatment apparatus according to an aspect of the present disclosure provides the following characteristics.

According to an aspect of the present disclosure, a water treatment apparatus includes: a filter unit including a reverse osmosis filter to supply purified water filtered from raw water and residential water unable to be filtered from the raw water; a storage unit connected to the filter unit and including a storage member in which purified water is stored and from which purified water is discharged and a housing, which includes the storage member disposed therein, and, through which residential water flows in and out; and a flow path changing valve connected to the filter unit and the storage unit, and allowing residential water to flow from the housing while purified water is stored in the storage member, or allowing purified water to be discharged from the storage member while residential water flows into the housing.

In this case, the flow path changing valve may include: a first body portion connected to the reverse osmosis filter and the housing by a connection line; and a second body portion connected to the first body portion, and connected to the storage member and the reverse osmosis filter by a connection line.

The first body portion may be respectively connected to a residential water line connected to the reverse osmosis filter, a drain branch line connected to a drain line branching off from the residential water line, and an inlet-outlet line connected to the housing. The second body portion may be connected to a discharge line branching off from a purified line connected to the reverse osmosis filter and the storage member.

The second body portion may be connected to a connection discharge line connected to a water discharge member.

The flow path changing valve may allow the inlet-outlet line and the drain branch line to be connected to each other when purified water is stored in the storage member, and may allow the inlet-outlet line and the residential water line to be connected to each other when the purified water stored in the storage member is discharged to a water discharge member directly or indirectly connected to the discharge line.

The flow path changing valve may further include a plunger provided in the first body portion to be movable and allowing the inlet-outlet line to be connected to the drain branch line or the residential water line according to a location of the plunger.

The flow path changing valve may further include a pressing portion provided in the first body portion to be movable and moving the plunger through a difference in pressure between the first body portion and the second body portion.

The first body portion may include a movement portion, which is connected to the residential water line, the drain branch line, and the inlet-outlet line, respectively, and in which the plunger is provided to be movable; and a pressure transfer portion, which is connected to the movement portion and the second body portion, and in which the pressing portion is provided to be movable.

The pressing portion may include: a pressing member in contact with the plunger and provided in the pressure transfer portion to be movable; and a first diaphragm provided on the pressing member to receive pressure of the second body portion.

The pressing portion may further include a second diaphragm provided on the pressing member to be in contact with the plunger.

The second body portion may include a connection flow path formed therein and connected to the discharge line, and the connection flow path may include a connection hole formed therein and connected to the pressure transfer portion.

The connection flow path may be connected to a connection discharge line connected to a water discharge member.

The plunger may be elastically supported by an elastic member.

The filter unit may further include an automatic shut-off valve allowing raw water to flow into the filter unit or blocking raw water from flowing into the filter unit, according to an amount of pressure in the purified water line.

The automatic shut-off valve may be connected to a raw water line connected to the reverse osmosis filter to supply raw water and the purified water line.

The filter unit may further include a first water filter connected to the reverse osmosis filter by a connection line, and the automatic shut-off valve may be connected to the connection line and the purified water line.

On a portion of the purified water line between the automatic shut-off valve and the reverse osmosis filter, a first check valve may be provided.

On the discharge line, a second water filter may be provided.

On the discharge line between a portion branching off from the purified water line and the flow path changing valve, a second check valve may be provided.

Advantageous Effects

As set forth above, according to exemplary embodiments in the present disclosure, by using a single flow path changing valve, purified water filtered by a reverse osmosis filter may be stored in a storage member provided within a housing, or residential water unable to be filtered by the reverse osmosis filter may flow into the housing, thereby discharging purified water stored in a storage member.

In addition, according to an exemplary embodiment in the present disclosure, while a reverse osmosis filter is used, purified water may be easily externally discharged.

In addition, according to an exemplary embodiment, while a reverse osmosis filter is used, a location of a water discharge member from which purified water is discharged may not be limited.

In addition, according to an exemplary embodiment in the present disclosure, counterpressure may not act on a reverse osmosis filter.

Further, according to an exemplary embodiment in the present disclosure, a reduction in a flow rate of purified water filtered and discharged by a reverse osmosis filter may be prevented, and deterioration in filtering efficiency may be prevented.

DESCRIPTION OF DRAWINGS

FIG. 1 illustrates a configuration of a water treatment apparatus according to an exemplary embodiment in the present disclosure.

FIG. 2 is a cross-sectional view illustrating an example of a flow path changing valve included in a water treatment apparatus according to an exemplary embodiment in the present disclosure.

FIG. 3 is a cross-sectional view illustrating another example of a flow path changing valve included in a water treatment apparatus according to an exemplary embodiment in the present disclosure.

FIG. 4 is a cross-sectional view illustrating another example of a flow path changing valve included in a water treatment apparatus according to an exemplary embodiment in the present disclosure.

FIG. 5 is a view illustrating operations of a water treatment apparatus according to an exemplary embodiment in the present disclosure, in a case in which purified water is stored in a storage member.

FIG. 6 is a cross-sectional view of a flow path changing valve illustrated in FIG. 5.

FIG. 7 is a view illustrating operations of a water treatment apparatus according to an exemplary embodiment in the present disclosure, in a case in which purified water is discharged from a storage member.

FIG. 8 is a cross-sectional view of a flow path changing valve illustrated in FIG. 7.

FIG. 9 is a view illustrating operations of a water treatment apparatus according to an exemplary embodiment in the present disclosure, in a case in which a storage member is full of purified water.

FIG. 10 is a cross-sectional view of a flow path changing valve illustrated in FIG. 9.

FIG. 11 illustrates a configuration of a water treatment apparatus according to another exemplary embodiment in the present disclosure.

FIG. 12 is a cross-sectional view of a flow path changing valve included in a water treatment apparatus according to another exemplary embodiment in the present disclosure.

FIG. 13 illustrates a configuration of a water treatment apparatus according to another exemplary embodiment in the present disclosure.

FIG. 14 is a cross-sectional view of a flow path changing valve included in a water treatment apparatus according to another exemplary embodiment in the present disclosure.

MODE FOR INVENTION

Hereinafter, a water treatment apparatus according to an exemplary embodiment in the present disclosure will be described in detail, to provide an understanding of characteristics according to exemplary embodiments in the present disclosure.

Exemplary embodiments in the present disclosure will be described in detail with reference to the accompanying drawings. The invention may, however, be embodied in many different forms and should not be construed as being limited to the embodiments set forth herein. Thus, exemplary embodiments of the present disclosure may be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 illustrates a configuration of a water treatment apparatus according to an exemplary embodiment in the present disclosure. FIG. 2 is a cross-sectional view illustrating an example of a flow path changing valve included in a water treatment apparatus according to an exemplary embodiment in the present disclosure. FIG. 3 is a cross-sectional view illustrating another example of a flow path changing valve included in a water treatment apparatus according to an exemplary embodiment in the present disclosure. FIG. 4 is a cross-sectional view illustrating another example of a flow path changing valve included in a water treatment apparatus according to an exemplary embodiment in the present disclosure.

FIG. 5 is a view illustrating operations of a water treatment apparatus according to an exemplary embodiment in the present disclosure, in a case in which purified water is stored in a storage member. FIG. 6 is a cross-sectional view of a flow path changing valve illustrated in FIG. 5.

FIG. 7 is a view illustrating operations of a water treatment apparatus according to an exemplary embodiment in the present disclosure, in a case in which purified water is discharged from a storage member. FIG. 8 is a cross-sectional view of a flow path changing valve illustrated in FIG. 7.

FIG. 9 is a view illustrating operations of a water treatment apparatus according to an exemplary embodiment in the present disclosure, in a case in which a storage member is full of purified water. FIG. 10 is a cross-sectional view of a flow path changing valve illustrated in FIG. 9.

A water treatment apparatus 100 according to an exemplary embodiment may include a filter unit 200, a storage unit 300, and a flow path changing valve 400, as illustrated in FIG. 1.

Filter Unit

The filter unit 200 may include a reverse osmosis filter 210. Thus, the filter unit 200 may supply purified water filtered from raw water and residential water, unable to be filtered from raw water, as illustrated in FIGS. 5 and 7.

As illustrated in FIG. 1, a raw water line LRW connected to a raw water supply source (not shown) of a waterworks or the like may be connected to the filter unit 200. Thus, as illustrated in FIGS. 5 and 7, raw water from a raw water supply source may be supplied to the filter unit 200.

A reducing valve VRD may be provided on the raw water line LRW as illustrated in FIG. 1. Thus, in a case in which pressure of raw water supplied by the raw water supply source is higher than a predetermined pressure, pressure of the raw water may be reduced to a predetermined level while passing through the reducing valve VRD, and then, may be supplied to the filter unit 200.

The filter unit 200 may further include a first water filter 220 connected to the reverse osmosis filter 210 by a connection line LC. The first water filter 220 may be connected to the raw water line LRW. Thus, raw water may first be filtered by the first water filter 220 and may then be filtered by the reverse osmosis filter 210.

As the first water filter 220, any water filter capable of filtering water, used in the art, may be used without particular limitation thereon.

In addition, the filter unit 200 may include other water filters as well as the first water filter 220. The number of other water filters included in the filter unit 200 is not particularly limited, and thus, any number thereof may be available for the use thereof.

The reverse osmosis filter 210 may be connected to a storage member 310 included in a storage unit 300 to be described later by a purified water line LPW. Thus, purified water filtered by the reverse osmosis filter 210 may flow in the purified water line LPW and may be stored in the storage member 310, as illustrated in FIG. 5.

In addition, the reverse osmosis filter 210 may be connected to a flow path changing valve 400 to be described later by a residential water line LLW. Thus, as illustrated in FIG. 7, residential water may flow in the residential water line LLW to be supplied to a housing 320 included in the storage unit 300 to be described later. Then, purified water stored in the storage member 310 may be discharged from the storage member 310.

A drain line LD may branch off from the foregoing residential water line LLW. A residential water valve VLW may be provided on the drain line LD. Further, the drain line LD may be connected to a drain branch line LDS connected to the flow path changing valve 400 described below.

Thus, as illustrated in FIG. 5, residential water discharged from the housing 320 of the storage unit 300 and flowing in an inlet-outlet line LEI connecting the housing 320 of the storage unit 300 to the flow path changing valve 400 may be externally discharged through the drain branch line LDS and the drain line LD.

In a different manner, a discharge line LE branching off from the purified water line LPW may be connected to the flow path changing valve 400 to be described below, so as to be connected to a water discharge member 500 of a cock, a faucet or the like. Thus, as illustrated in FIG. 7, water stored in the storage member 310 of the storage unit 300 may flow to the water discharge member 500 through the purified water line LPW, the discharge line LE, and the flow path changing valve 400, to thus be externally discharged and supplied to a user.

In addition, a second water filter 230 may be provided on the discharge line LE as illustrated in FIG. 1. Thus, as illustrated in FIG. 7, when purified water stored in the storage member 310 is discharged through the discharge line LE, the purified water may be filtered by the second water filter 230 and then discharged.

As the second water filter 230 provided on the discharge line LE, any water filter capable of filtering water, used in the art, may be used without particular limitation. In addition, the number of water filters provided on the discharge line LE is not particularly limited, and thus, any number thereof may be employed.

As illustrated in FIG. 1, a second check valve CV2 may be provided on the discharge line LE between a portion branching off from the purified water line LPW and the flow path changing valve 400.

Thus, pressure in a portion of the discharge line LE between the second check valve CV2 and the water discharge member 500, and in a connection discharge line LCE connecting the flow path changing valve 400 to the water discharge member 500, may be maintained at a predetermined pressure. As illustrated in FIG. 5, when purified water is stored in the storage member 310 included in the storage unit 300 to be described later, the flow path changing valve 400 may allow the inlet-outlet line LEI and the drain branch line LDS to be continuously connected to each other as illustrated in FIG. 6.

The filter unit 200 may further include an automatic shut-off valve 240. The automatic shut-off valve 240 may allow raw water to flow into the filter unit 200 or to block inflow of raw water thereinto according to pressure in the purified water line LPW. To this end, the automatic shut-off valve 240 may be connected to the raw water line LRW or the connection line LC. In addition, the automatic shut-off valve 240 may be connected to the purified water line LPW.

As illustrated in FIGS. 5 and 7, when purified water flows into the storage member 310 to be stored therein or is discharged from the storage member 310, since the purified water line LPW has pressure lower than a predetermined pressure level, for example, a pressure of the raw water line LRW or the connection line LC, the automatic shut-off valve 240 may be opened. Thus, raw water may flow into the filter unit 200.

As illustrated in FIG. 9, when the storage member 310 is full of purified water, pressure of the purified water line LPW may reach a predetermined pressure level, for example, a pressure corresponding to 60% of pressure of raw water, and thus, the automatic shut-off valve 240 may be closed. Thus, raw water may not flow into the filter unit 200.

The configuration of the automatic shut-off valve 240 is not particularly limited. Any configuration thereof, used in the art, in which raw water may flow into the filter unit 200 or the inflow of raw water may be blocked according to pressure in the purified water line LPW, may be employed.

A first check valve CV1 may be provided on a portion of the purified water line LPW between the automatic shut-off valve 240 and the reverse osmosis filter 210 as illustrated in FIG. 1. Thus, as illustrated in FIG. 9, when the storage member 310 is full of purified water, even in a case in which water present in the reverse osmosis filter 210 is discharged through the drain line LD, a flow of water present in the purified water line LPW, into the reverse osmosis filter 210, may be prevented. Thus, pressure of the purified water line LPW may be maintained at a predetermined level. In addition, the automatic shut-off valve 240 may be continuously maintained in a state in which it is closed without opening.

Storage Unit

The storage unit 300 may be connected to the filter unit 200. The storage unit 300 may include the storage member 310 and the housing 320.

Purified water may be stored in the storage member 310 as illustrated in FIG. 5. Further, purified water stored in the storage member 310 may be discharged from the storage member 310 as illustrated in FIG. 7. To this end, the storage member 310 may be connected to the purified water line LPW as described above.

The housing 320 may include the storage member 310 disposed therein. In addition, residential water may flow into the housing 320 as illustrated in FIG. 7, or may flow from the housing 320 as illustrated in FIG. 5. To this end, the housing 320 may be connected to the inlet-outlet line LEI connected to the flow path changing valve 900 to be described later.

Flow Path Changing Valve

The flow path changing valve 400 may be connected to the filter unit 200 and the storage unit 300. In addition, as illustrated in FIG. 5, residential water may flow from the housing 320 of the storage unit 300 while purified water is stored in the storage member 310 of the storage unit 300 by the flow path changing valve 400. Further, as illustrated in FIG. 7, purified water may be discharged from the storage member 310 while residential water flows into the housing 320 by the flow path changing valve 400.

Thus, purified water may be easily externally discharged, while using the reverse osmosis filter 210. In addition, a location of the water discharge member 500 discharging purified water may not be limited.

As illustrated in FIG. 5, for example, when purified water is stored in the storage member 310, the flow path changing valve 400 may allow the inlet-outlet line LEI and the drain branch line LDS to be connected to each other.

Thus, residential water stored in the housing 320 may flow through the inlet-outlet line LEI and the drain branch line LDS. The residential water flowing in the drain branch line LDS may flow into the drain line LD to be drained externally through the drain line LD.

In this case, since the water discharge member 500 is closed, purified water filtered by the reverse osmosis filter 210 flows in the purified water line LPW and is stored in the storage member 310 of the storage unit 300.

In addition, when purified water stored in the storage member 310 is externally discharged through the water discharge member 500 as illustrated in FIG. 7, the flow path changing valve 400 may allow the inlet-outlet line LEI and the residential water line LLW to be connected to each other.

Thus, residential water unable to be filtered by the reverse osmosis filter 210 may flow in the residential water line LLW and the inlet-outlet line LEI, to thus flow into the housing 320 of the storage unit 300. In addition, purified water stored in the storage member 310 may flow into the water discharge member 500 through the purified water line LPW and the discharge line LE, since the water discharge member 500 is opened. Further, the purified water may be externally discharged through the water discharge member 500, to be supplied to a user.

The flow path changing valve 400 may include a first body portion 410 and a second body portion 420 as illustrated in FIG. 2.

The first body portion 410 may be connected to the reverse osmosis filter 210 and the housing 320 by a connection line. To this end, the residential water line LLW, the drain branch line LDS, and the inlet-outlet line LEI may be respectively connected to the first body portion 410.

The first body portion 410 may include a residential water port 411 connected to the residential water line LLW, a drain port 412 connected to the drain branch line LDS, and an inlet-outlet port 413 connected to the inlet-outlet line LEI.

In addition, a plunger 430 may be provided in the first body portion 410, to be movable. According to a location of the plunger 430, the inlet-outlet line LEI may be connected to the drain branch line LDS as illustrated in FIG. 5, or may be connected to the residential water line LLW as illustrated in FIG. 7.

The first body portion 410 may include a movement portion 414, in which the plunger 430 is provided to be movable. The movement portion 414 may be connected to the residential water port 411, the drain port 412, and the inlet-outlet port 413. Thus, the movement portion 414 may be respectively connected to the residential water line LLW, the drain branch line LDS, and the inlet-outlet line LEI.

In addition, in the first body portion 410, a pressing portion 440 may be provided to be movable. The pressing portion 440 may allow the plunger 430 to be moved according to a pressure difference between the first body portion 410 and the second body portion 420.

A pressure transfer portion 415 may be formed in the first body portion 410 to be connected to the movement portion 414 described above and the second body portion 920 to be described later. The pressing portion 440 may be provided in the pressure transfer portion 415 to be movable.

The pressing portion 440 may include a pressing member 441, a first diaphragm 442, and a second diaphragm 443, as illustrated in FIG. 2.

The pressing member 441 may be in contact with the plunger 430. As illustrated in FIG. 2, the second diaphragm 443 is provided on the pressing member 441 to be in contact with the plunger 930. In detail, the pressing member 441 may be in indirect contact with the plunger 430. In addition, the pressing member 441 may also be in direct contact with the plunger 430 as illustrated in FIG. 3 to be described later.

The first diaphragm 442 may be provided on the pressing member 441 to receive pressure of the second body portion 420. In addition, the second diaphragm 443 may be provided on the pressing member 441 to be in contact with the plunger 430.

In a different manner, as illustrated in FIG. 3, the pressing portion 440 may only include the pressing member 441 and the first diaphragm 442. In detail, the pressing member 441 may also be in direct contact with the plunger 430, instead of being in indirect contact therewith through the second diaphragm 443.

However, the configuration of the pressing portion 440 is not particularly limited. Any configuration of the pressing portion 440, used in the art, in which the pressing portion 440 may be provided to be movable in the first body portion 410 and which may allow the plunger 430 to be moved according to a pressure difference between the first body portion 410 and the second body portion 420, may be employed.

In a different manner, the plunger 430 may be elastically supported by an elastic member 431 as illustrated in FIG. 4. For example, the elastic member 431 may be provided on the plunger 430 to elastically support an upper portion of the plunger 430. Thus, elastic force of the elastic member 431 may act on the upper portion of the plunger 430.

As illustrated in FIG. 8, as force acts on an upper portion of the plunger 430 from residential water having flowed to the residential water port 411, when the plunger 430 descends, even in a case in which the force acting on the upper portion of the plunger 430 by the residential water is relatively weak, elasticity of the elastic member 431 may act together therewith. Thus, the plunger 430 may easily descend.

In addition, as illustrated in FIG. 6, when force applied to the first diaphragm 442 of the pressing portion 440, by pressure acting on a connection flow path 421 formed in the second body portion 420 to be described later, is increased to be greater than force applied to the upper portion of the plunger 430 by the residential water, the plunger 430 may ascend.

As described above with reference to FIG. 4, in the configuration in which the upper portion of the plunger 430 is elastically supported by the elastic member 431, only when force applied to the first diaphragm 442 of the pressing portion 440 is greater than a sum of force applied to the upper portion of the plunger 430 by the residential water, and elasticity applied to the upper portion of the plunger 430 by the elastic member 431, the plunger 430 may ascend.

Thus, if the plunger does not necessarily need to ascend, the plunger 430 may not ascend only with force applied to the first diaphragm 442 of the pressing portion 440 through pressure acting on the connection flow path 421 of the second body portion 420.

Therefore, the plunger 430 may exhibit reliability in operations thereof.

Although the elastic member 431 may elastically support the upper portion of the plunger 430 as described above with reference to FIG. 4, the elastic member 431 may also elastically support a lower portion of the plunger 430. In addition, elastic members 431 may also support upper and lower portions of the plunger 430, respectively.

The elastic member 431 elastically supporting the plunger 430 is not limited to a coil spring illustrated in FIG. 4. Any member capable of elastically supporting the plunger 430, used in the art, of a plate spring or the like, may be used.

The second body portion 420 may be connected to the first body portion 410. The second body portion 420 may be connected to the storage member 310 and the reverse osmosis filter 210 by a connection line. To this end, the discharge line LE described above may be connected to the second body portion 420. Further, the second body portion 420 may be connected to a connection discharge line LCE connected to the water discharge member 500.

The connection flow path 421 may be formed in the second body portion 420 to be connected to the discharge line LE and the connection discharge line LCE. In detail, the discharge line LE may be connected to one end of the connection flow path 421, and the connection discharge line LCE may be connected to another end of the connection flow path 421.

In addition, a connection hole 421a connected to the pressure transfer portion 415 of the first body portion 410 may be formed in the connection flow path 421. Thus, pressure of the connection flow path 421 of the second body portion 420 may be transferred to the first diaphragm 442 of the pressing member 440 through the connection hole 421a.

In a different manner, as illustrated in FIG. 2, although the second body portion 420 may be connected to the first body portion 410, in such a manner that the connection flow path 421, and a virtual line connecting the drain port 412 and the inlet-outlet port 413 of the first body portion 410 to each other, are parallel to each other, the second body portion 420 may also be connected to the first body portion 410 to be inclined with respect to each other, for example, to be perpendicular to each other, for convenience of connection thereof to the discharge line LE and the connection discharge line LCE.

In addition, the second body portion 420 and the first body portion 410 may also be configured, in such a manner that the connection flow path 421 of the second body portion 420, and a virtual line connecting the drain port 412 of the first body portion 410 to the inlet-outlet port 413 thereof to each other, form any angle or a specific angle.

For example, the first body portion 410 and the second body portion 420 may be formed to have cylindrical shapes, square parallelepiped shapes, or rectangular parallelepiped shapes.

By the configuration described above, in a state in which purified water is not stored in the storage member 310 and the water discharge member 500 is closed, pressure in the purified water line LPW may be lower than a predetermined pressure. Thus, the automatic shut-off valve 240 is opened, to allow raw water to flow in through the raw water line LRW as illustrated in FIG. 5.

The raw water having flowed into the raw water line LRW may pass through the reducing valve VRD and flow into the first water filter 220 to be filtered. Raw water filtered by the first water filter 220 may flow into the reverse osmosis filter 210. In the raw water having flowed into the reverse osmosis filter 210, purified water filtered by the reverse osmosis filter 210 may flow in the purified water line LPW and be stored in the storage member 310 of the storage unit 300.

When purified water filtered by the reverse osmosis filter 210 is continuously stored in the storage member 310 of the storage unit 300, pressure of the storage member 310 may be increased. Thus, pressure in the discharge line LE branching off from the purified water line LPW connected to the storage member 310, and pressure in the connection flow path 421 of the flow path changing valve 400 connected to the discharge line LE may also be increased.

Further, when force applied to the first diaphragm 442 of the pressing portion 440, by pressure of the connection flow path 421, is increased to be greater than force applied to an upper portion of the plunger 430 by residential water, as illustrated in FIG. 6, the plunger 430 may be moved to a position in which the inlet-outlet line LEI and the drain branch line LDS are connected, for example, the plunger 430 may ascend.

Thus, as illustrated in FIG. 5, the residential water present in the housing 320 of the storage unit 300 may flow in the inlet-outlet line LEI to thus flow into the drain branch line LDS. Then, the residential water may be drained through the drain line LD. Thus, purified water may be continuously stored in the storage member 310 of the storage unit 300.

As such, when purified water filtered by the reverse osmosis filter 210 is stored in the storage member 310 of the storage unit 300, since pressure other than pressure of purified water does not act on the storage member 310, counterpressure may not act on the reverse osmosis filter 210.

Thus, a flow rate of purified water filtered by and discharged from the reverse osmosis filter 210 may not be reduced, and filtering efficiency may not be deteriorated.

In a different manner, residential water unable to be filtered by the reverse osmosis filter 210 may flow in the residential water line LLW as illustrated in FIG. 5 to only flow to the residential water port 411 of the flow path changing valve 400 as illustrated in FIG. 6, or may be drained through the drain line LD.

In a different manner, when the storage member 310 of the storage unit 300 is full of purified water as illustrated in FIG. 9, pressure in the purified water line LPW may be increased to be higher than a predetermined pressure. Thus, the automatic shut-off valve 240 may be closed, and raw water may not flow in through the raw water line LRW.

In this case, as described above, even in a case in which water present in the reverse osmosis filter 210 is discharged through the drain line LD, pressure in the purified water line LPW may be maintained at a predetermined level by the first check valve CV1. Since pressure in the purified water line LPW may be maintained at a predetermined pressure as described above, the automatic shut-off valve 240 may not be opened while a closed state thereof is continuously maintained.

In a state in which the storage member 310 of the storage unit 300 is full of purified water, when the water discharge member 500 is opened as illustrated in FIG. 7, purified water stored in the storage member 310 may flow in the purified water line LPW and may flow into the second water filter 230 provided on the discharge line LE to be filtered.

Purified water filtered by the second water filter 230 may flow to the water discharge member 500 through the discharge line LE, the connection flow path 421 of the flow path changing valve 400, and the connection discharge line LCE. In addition, purified water may be externally discharged through the water discharge member 500 to be supplied to a user.

As the purified water is discharged through the water discharge member 500, when pressure of the purified water line LPW is lowered to be less than a predetermined pressure, the automatic shut-off valve 240 may be opened. In addition, raw water may flow in through the raw water line LRW to be filtered by the first water filter 220 as illustrated in FIG. 7.

The raw water filtered by the first water filter 220 may flow into the reverse osmosis filter 210 as illustrated in FIG. 7. In raw water having flowed into the reverse osmosis filter 210, purified water filtered by the reverse osmosis filter 210 may flow in the purified water line LPW to flow into the second water filter 230. In addition, residential water unable to be filtered by the reverse osmosis filter 210 may flow in the residential water line LLW or the drain line LD.

In this case, residential water unable to be filtered by the reverse osmosis filter 210 may flush the reverse osmosis filter 210. Thus, a lifespan of the reverse osmosis filter 210 may be extended.

Residential water may flow to the residential water port 411 of the flow path changing valve 400 through the residential water line LLW, as illustrated in FIG. 8. Thus, residential water may apply force to one side of the plunger 430, for example, to an upper portion of the plunger 430 as illustrated in FIG. 8.

In addition, when force applied to an upper portion of the plunger 430 from the residential water is increased to be greater than force applied to the first diaphragm 442 of the pressing portion 440 by purified water flowing in the connection flow path 421 of the flow path changing valve 400, the plunger 430 may be moved to a position in which the inlet-outlet line LEI and the residential water line LLW are connected to each other, for example, may descend as illustrated in FIG. 8.

Thus, residential water flowing in the residential water line LLW may flow into the inlet-outlet line LEI and flow in the inlet-outlet line LEI to then flow into the housing 320 of the storage portion 300. Thus, purified water stored in the storage member 310 of the storage unit 300 may be continuously discharged.

Other Exemplary Embodiments

FIG. 11 illustrates a configuration of a water treatment apparatus according to another exemplary embodiment in the present disclosure. FIG. 12 is a cross-sectional view of a flow path changing valve included in a water treatment apparatus according to another exemplary embodiment in the present disclosure.

FIG. 13 illustrates a configuration of a water treatment apparatus according to another exemplary embodiment in the present disclosure. FIG. 14 is a cross-sectional view of a flow path changing valve included in a water treatment apparatus according to another exemplary embodiment in the present disclosure.

The water treatment apparatuses 100 according to other exemplary embodiments in the present disclosure has a difference from the water treatment apparatus 100 according to the exemplary embodiment in the present disclosure described above with reference to FIGS. 1 to 10, in terms of a configuration of connection between a discharge line LE, a flow path changing valve 400, and a water discharge member 500.

Thus, only differences therebetween will be described below, and a description of configurations overlapping with those of the foregoing exemplary embodiment will be substituted with the description above with reference to FIGS. 1 to 10.

With reference to FIG. 11, in a water treatment apparatus 100 according to another exemplary embodiment in the present disclosure, a discharge line LE may be directly connected to a water discharge member 500. In addition, a branch connection line LSC branching off from the discharge line LE may be connected to one end of a connection flow path 421 formed in the second body portion 420 of the flow path changing valve 400. Another end of the connection flow path 421 may be closed by a closure member 422 as illustrated in FIG. 12.

In such a configuration, pressure of the discharge line LE may also be transferred to the connection flow path 421 of the flow path changing valve 400, to allow the flow path changing valve 400 to operate.

In a different manner, in a water treatment apparatus 100 according to another exemplary embodiment in the present disclosure, a discharge line LE may be directly connected to a water discharge member 500 as illustrated in FIG. 13. In addition, as illustrated in FIG. 14, a connection flow path 421 formed in a second body portion 420 of a flow path changing valve 400 may have one end and the other end which are not open. In addition, a branch connection line LSC branching off from a discharge line LE may be connected to a connection flow path 421, for example, to a central portion of the connection flow path 421, as illustrated in FIG. 14.

In such a configuration, pressure of the discharge line LE may also be transferred to the connection flow path 421 of the flow path changing valve 400, to allow the flow path changing valve 400 to operate.

As set forth above, with water treatment apparatuses according to exemplary embodiments in the present disclosure, by using a single flow path changing valve, purified water filtered by a reverse osmosis filter may be stored in a storage member provided within a housing, or residential water unable to be filtered by the reverse osmosis filter may flow into the housing, thereby discharging purified water stored in a storage member.

Thus, while a reverse osmosis filter is used, purified water may be easily externally discharged, and a location of a water discharge member from which purified water is discharged may not be limited.

Further, counterpressure may not act on a reverse osmosis filter, a flow rate of purified water filtered and discharged by a reverse osmosis filter may not be reduced. In addition, filtering efficiency may not be deteriorated.

The configuration of a water treatment apparatus according to exemplary embodiments is not limited to the description above. The entirety or a portion of the respective exemplary embodiments in the present disclosure described above may be selectively combined and configured to be modified.

The invention claimed is:

1. A water treatment apparatus comprising:
   a filter unit including a reverse osmosis filter to supply purified water filtered from raw water in the reverse osmosis filter and residential water unable to be filtered from the raw water in the reverse osmosis filter;
   a storage unit connected to the filter unit and including a storage member in which purified water is stored and from which purified water is discharged and a housing, which includes the storage member disposed therein, through which residential water flows in and out;
   a flow path changing valve connected to the filter unit and the storage unit, and allowing residential water to flow from the housing while purified water is stored in the storage member, or allowing purified water to be discharged from the storage member while residential water flows into the housing;
   a residential water line connected between the reverse osmosis filter and a residential water port of the flow path changing valve;
   a drain line branching off from the residential water line;
   a drain branch line connected between the drain line and a drain port of the flow path changing valve;
   an inlet-outlet line connected between the housing and an inlet-outlet port of the flow path changing valve;
   a purified line connected between the reverse osmosis filter and the storage member;
   a discharge line branching off from the purified line; and
   a water discharge member directly or indirectly connected to the discharge line,
   wherein the flow path changing valve comprises a first body portion including the residential water port, the drain port, and the inlet-outlet port and a second body portion connected to the discharge line,
   the first body portion is respectively connected to the residential water line, the drain branch line, and the inlet-outlet line, and the second body portion is connected to the discharge line,
   the flow path changing valve allows the inlet-outlet line and the drain branch line to be connected to each other when purified water is stored in the storage member, and allows the inlet-outlet line and the residential water line to be connected to each other when the purified water stored in the storage member is discharged to a water discharge member directly or indirectly connected to the discharge line,
   the first body portion comprises a movement portion, which is connected to the residential water line, the drain branch line, and the inlet-outlet line, respectively, and in which a plunger is provided to be movable; and a pressure transfer portion, which is connected to the movement portion and the second body portion, and in which a pressing portion is provided to be movable and to contact to the plunger,
   the second body portion comprises a connection flow path formed therein and connected to the discharge line, and the connection flow path comprises a connection hole formed therein and connected to the pressure transfer portion, and
   the plunger allows the inlet-outlet line to be connected to the drain branch line or the residential water line according to a location of the plunger, and the pressing portion moves the plunger through a difference in pressure between the first body portion and the second body portion.

2. The water treatment apparatus of claim 1, wherein the second body portion is connected to a connection discharge line connected to a water discharge member.

3. The water treatment apparatus of claim 1, wherein the pressing portion comprises:
- a pressing member in contact with the plunger and provided in the pressure transfer portion to be movable; and
- a first diaphragm provided on the pressing member to receive pressure of the second body portion.

4. The water treatment apparatus of claim 3, wherein the pressing portion further comprises a second diaphragm provided on the pressing member to be in contact with the plunger.

5. The water treatment apparatus of claim 1, wherein the connection flow path is connected to a connection discharge line connected to a water discharge member.

6. The water treatment apparatus of claim 1, wherein the plunger is elastically supported by an elastic member.

7. The water treatment apparatus of claim 1, wherein the filter unit further comprises an automatic shut-off valve allowing raw water to flow into the filter unit or blocking raw water from flowing into the filter unit, according to a pressure of the purified water line.

8. The water treatment apparatus of claim 7, wherein the automatic shut-off valve is connected to a raw water line connected to the reverse osmosis filter to supply raw water and the purified water line.

9. The water treatment apparatus of claim 7, wherein the filter unit further comprises a first water filter connected to the reverse osmosis filter by a connection line, and the automatic shut-off valve is connected to the connection line and the purified water line.

10. The water treatment apparatus of claim 8, wherein on a portion of the purified water line between the automatic shut-off valve and the reverse osmosis filter, a first check valve is provided.

11. The water treatment apparatus of claim 1, wherein on the discharge line, a second water filter is provided.

12. The water treatment apparatus of claim 1, wherein on the discharge line between a portion branching off from the purified water line and the flow path changing valve, a second check valve is provided.

13. The water treatment apparatus of claim 9, wherein on a portion of the purified water line between the automatic shut-off valve and the reverse osmosis filter, a first check valve is provided.

\* \* \* \* \*